United States Patent [19]

Gahlau et al.

[11] Patent Number: 4,735,284

[45] Date of Patent: Apr. 5, 1988

[54] ADHESIVE INSULATION SYSTEM

[75] Inventors: Heinemann Gahlau, Celle; Manfred Hoffmann, Neinhof; Christoph Kittel, Nienhagen, all of Fed. Rep. of Germany

[73] Assignee: Dr. Alois Stankiewicz GmbH, Adelheidsdorf, Fed. Rep. of Germany

[21] Appl. No.: 842,462

[22] Filed: Mar. 21, 1986

[30] Foreign Application Priority Data

Mar. 26, 1985 [DE] Fed. Rep. of Germany ....... 3510932

[51] Int. Cl.$^4$ .............................................. E04B 1/82
[52] U.S. Cl. .................................... 181/290; 181/204; 181/291; 181/294
[58] Field of Search ............... 181/204, 290, 291, 294; 528/45, 49; 521/116; 427/389.9

[56] References Cited

U.S. PATENT DOCUMENTS

| | | | |
|---|---|---|---|
| 2,325,594 | 8/1947 | Denman | 181/294 X |
| 2,819,032 | 1/1958 | Detrie et al. | 181/291 X |
| 3,437,622 | 4/1969 | Dahl | 524/270 |
| 3,681,277 | 4/1972 | Scholz et al. | 525/131 |
| 4,247,656 | 1/1981 | Janssen | 521/116 X |
| 4,322,327 | 3/1982 | Yoshimura et al. | 528/49 X |
| 4,463,049 | 7/1984 | Kracke | 181/286 X |
| 4,474,836 | 10/1984 | Lukoschek et al. | 427/389.9 |
| 4,487,794 | 12/1984 | Brown et al. | 181/291 X |

FOREIGN PATENT DOCUMENTS

| | | |
|---|---|---|
| 1594052 | 9/1969 | Fed. Rep. of Germany . |
| 7722545 | 10/1977 | Fed. Rep. of Germany . |
| 8201510 | 9/1982 | Fed. Rep. of Germany . |
| 3300424 | 4/1983 | Fed. Rep. of Germany . |

OTHER PUBLICATIONS

Römapps Chemi-Lexikon, 7 Edition (1973), p. 1396.
Angewandte Chemie, Edition A, 59 (Sep. 1947) No. 9, pp. 257-272.
Firmenschrift (Company paper) Bayer-Kunststoffe, 1955, pp. 39-47.
Kunststoffe, 50 (1960) 8, pp. 437-441.

*Primary Examiner*—Benjamin R. Fuller
*Attorney, Agent, or Firm*—Scully, Scott Murphy & Presser

[57] ABSTRACT

The invention relates to an adhesive insulating system that is non-destructively removable, e.g. for the purpose of repair, for sound insulation of partition walls, particularly in motor vehicles. To overcome the disadvantages associated with the previous systems in mounting and also in repair a layer of material of a highly under-cross-linked polyurethane is now applied between the substrate and the overlying layers. This polyurethane layer has, owing to its under-cross-linking, a great adhesive effect and thus enables the substrate and the insulating layers to be joined in a force-locked manner. The adhesive material layer can be prefabricated or is prepared by spraying on a highly under-cross-linked 2-component mixture of the polyurethane former.

17 Claims, 1 Drawing Sheet

ADHESIVE INSULATION SYSTEM

TECHNICAL FIELD OF THE INVENTION

The invention relates to an adhesive, non-destructively removable insulation system for sound insulation of partition walls, particularly in motor vehicles.

BRIEF DESCRIPTION OF THE PRIOR ART

For the second insulation of partition walls between a space in which noise is produced and a space that is to be protected, particularly between the engine and passenger compartments of motor vehicles, various materials and systems have been developed which are today used in mass-production. Such materials and systems work in various ways, e.g. by insulating airborne sound, by absorbing airborne sound and by absorbing structure-borne sound, and also by combining these properties in one and the same material or system. To make full use of their acoustically effective properties, these products must as a rule be joined to the substrate, in this case the partition wall, by glueing them on over the whole surface. Particularly in the case of extensive front wall insulation of motor vehicles such glueing on is, for reasons of assembly technique, either not possible or altogether undesirable, since it must be possible to remove the parts again without destroying them, for example for repairs. As a result, on the acoustically exposed front wall or partition wall between the engine and passenger compartments, the acoustic properties inherent in the material or the system, particularly that of absorption of structure-borne sound, can never be fully and effectively used when the presently preferred mass-elastic systems, consisting of foam or fibre, and special surface coatings, e.g. pliable surface coatings, are installed. This leads inter alia to the conclusion that beside the systems that are used for insulating the front wall of motor vehicles against airborne sound still further material coatings that absorb structure-borne sound have to be applied in separate process steps.

Process are known in the literature (cf. e.g. DE-OS-No. 15 94 052) in which the application of sound insulating parts is simplified by the use of magnetic adhesive forces. This however is limited to foils or to shaped parts that are provided with hot-melting glue and are held in the desired position by the magnetic adhesion during the melting process. These adhesive forces are unnecessary for effecting the absorption of structure-borne sound, since the absorption is effected by the firm connection between the partition wall and the foil due to the hot-melting glue.

For the sound insulation of front walls, shaped mouldings that fit to the contours are often used as a massspring system. It is true that shaped foils provided with magnetisable fillers can likewise be imbedded in these by known methods and, for example, surrounded by foam, but the weak magnetic forces usually applied would not effect a sufficiently great acoustic coupling to the substrate. This is due to the fact that the magnetic forces always act substantially in the direction normal to the surface and therefore cannot transmit tangential forces as strong as those that are needed to effect absorption of structure-borne sound.

OBJECT OF THE INVENTION

The object of the invention is therefore to provide, by means of adhesive coatings on such shaped parts, insulating systems that on the one hand make possible simple and secure mounting by movement into the desired position, and on the other hand, in the case of pressing on, to effect by the adhesion effect a force-locking connection to the partition wall that is such that the acoustic properties inherent in the overlying insulating layers, particularly the absorption of structure-borne sound, come fully into effect. In addition, the adhesive forces after positioning should be so strong that they are practically equivalent to glueing on, while however the system can if necessary still be removed again undamaged for the purpose of repair.

SUMMARY OF THE INVENTION

For the solution of this problem a highly under-cross-linked polyurethane system is proposed that exerts these desired adhesive forces. Such an under-cross-linked material is in fact known from the Gebrauchsmuster No. 82 01 510, but the cross-linking is controlled so that the degree of cross-linking varies locally over the surface so that there are locally varied acoustic properties. Furthermore, the acoustic properties described there can only be obtained with relatively thick layers.

If however the very imcomplete cross-linking is present over the whole surface of the coating, the result is a layer of material that, combined with the overlying insulating layers, effects the required adhesive connection between the insulating system and the substrate at smaller thicknesses, and thus brings fully into effect the damping properties of acoustic springs, in practice of viscoelastic foams, but also of fibres. For this purpose layers less than 1 mm suffice. For this purpose the adhesive material need not have any appreciable absorbing effect of its own.

A further advantage of the adhesive material is that in thicker layers it provides, in combination with stiff coverings, an additional component of the absorption of structure-borne sound, since it then acts as a kind of sandwich system. Suitable materials for coverings are cheap materials such as cardboard or kraft paper, preferably provided with holes to make possible the desired adhesion between the adhesive material, the stiff covering and the succeeding layers of foam or fibre or other acoustically active layers. The coatings can also consist of sprayable, hardening plastics.

In front wall insulation regions in which, for reasons of space, the acoustically effective springs cannot be used, the adhesive coating material is also effective alone as long as thicknesses of a few millimetres are permitted. Stiffening coverings are in any event always present in the form of barrier or heavy layers and carpets.

The use of the adhesive power of the coating material can also be distributed locally, e.g. at places where sound radiators have been detected by means of appropriate known tests. The damping effect of the adhesive insulating system is so great that structure-borne sound absorbing coatings that are otherwise additionally employed become wholly or partly unnecessary. In the sense of a total economic calculation cheaper sound insulation is achieved by the use of adhesive insulating systems without impairing the overall acoustic affect or the acoustic comfort in a vehicle.

The adhesive coating material can be introduced into the process of making formed parts from foam-backed heavy layers in a simple manner, for example by equipping the moulds needed for the production of such parts for deep drawing. A thin protective foil is then first of all deep drawn, and the adhesive coating material is sprayed over all or part of its surface. The usual further production processes then follow. Furthermore the adhesive coating material can be prefabricated and foamed on in known manner at predetermined locations on the mould.

Both foaming and non-foaming mixtures, either filled or unfilled, can be used as adhesive materials. Suitable fillers are for example barite, chalk, ground slate, carbon black and graphite.

The following examples serve to explain mixtures for the adhesive coating material, without the invention being limited thereto.

More particularly, the concept of an adhesive non-destructively removable insulating system for the sound insulation of partition walls, particularly for motor vehicles, on which the invention is generally based, can for example be realised by using a suitable bitumen mixture. It is seen from the relevant literature and the available brochure material (cf. e.g. "Tables and Summaries for the Use of Shell Bitumen", Deutsche Shell AG, 1986) that bitumen is recommended as an glue-type mass for sound and heat insulating materials. The point of the invention however is not to use glue-type masses, but rather adhesive coatings. Hence a mixture of materials is needed that meets their requirement, having regard above all to cold strength (cold flexibility). Thus if for example the cold strength value were to be too high the desired damping effect could not be achieved if such a system were used in vehicles, since the adhesive coating would separate from the metal sheet at low exterior temperatures, e.g. below the freezing point, and the strong adhesive connection needed for the effect according to the invention would no longer be obtained. With a bitumen mixture according to the invention this problem, namely the improvement of the cold flexibility, is solved by admixture of atactic polypropylene (APP). The cold flexibility can be indicated by the Fraass breaking point, which can be found in the relevant Tables.

Available kinds of bitumen that are considered to be the best are so-called distillation bitument and oxidation bitumen, of which the latter is also known as "blown" bitumen and has better properties in use as an adhesive coating than, e.g.,distillation bitumen, because its breaking point is generally lower. The adhesion can be described e.g. by the parameter "penetration" determined according to DIN 1995 as the depth of penetration of a needle acting on the bitumen test piece with a specified force and for a period of 10 seconds. Penetration values<15 characterised hard types of bitumen, while values>80 characterised very soft types. For the purpose envisaged, penetration values in the approximate range of between 15 and 40 have been found suitable. On account of the frequently great spatial deformation of the surface of the sound insulating parts for which an adhesive coating is provided, handling of the APP-bitumen mixture by means of a spraying device has much to recommend it. For this purpose it is further necessary to determine the proportion of APP to bitumen in the mixture that provides suitable application properties as well as having the adhesive effect according to the invention. The spraying device needed must withstand heating to about 220° C. so that the liquified material can be applied in a finely divided state under the spray pressure to the surface to be coated.

It has been found that proportions of APP to bitumen in the mixture from 1:1 to about 1:2 cannot be used with such a spraying device. Likewise the APP-bitumen mixture of about 1:4 has been found to be very sticky, so that this would not solve the problem. In contrast, an APP-bitumen mixture in the ratio of about 1:3 has been found suitable.

An example of a suitable mixture is that of the oxidation bitumen Mexphalt R 85/25 with atactic polypropylene Hoechst APP CR having the characterising properties: melt viscosity at 180° C.>50,000 mPa.sec and pentration value 35–55.

Fillers are also added to the mixture for fine control of the adhesive properties. For this purpose the inorganic materials known to those skilled in the art are suitable. In addition additives can be added, e.g. antioxidants to prevent embrittlement of the mixture. According to the state of the art, processing aids such as wax are also added.

EXAMPLE 1

Component A:
 1000 parts polyol, OH-number about 36
 100 parts diol, OH-number about 1000
 10 parts dibutyltin dilaurate (DBTL) as organometallic catalyst
 10 parts zeolitic molecular sieve, e.g. "Baylith-L" paste
 10 parts colour paste
Component B:
 Toluylene diisocyanate (TDI)-prepolymer, NCO content about 30%.
 Proportions of Component A: Component B in the mixture=about 4:1 (parts by weight), non-foaming.

EXAMPLE 2

Component A:
 1000 parts polyol, OH-number about 15
 100 parts diol, OH-number about 1000
 10 parts water
 10 parts amine catalyst, e.g. "Dabco R 8020" (1.4. diazabicyclo-(2, 2, 2) octane, 20% in DMEA (dimethylethanolamine)
 10 parts colour paste
 2000 parts BaSO$_4$
Component B:
 Diphenylmethane diisocyanate (MDI) NCO content about 30%.
 Proportions of Component A: Component B in the mixture=about 14:1 (parts by weight), foaming.

EXAMPLE 3

Component A:
 150 parts diol, OH-number about 250
 10 parts diol, OH-number about 1000
 20 parts polyol, OH-number about 165
 10 parts polyol, OH-number about 35
 50 parts molecular sieve, as in Example 1
 1 part dibutyltin dilaurate
 10 parts colour paste
 800 parts BaSO$_4$
Component B:
 Diphenylmethane diisocyanate NCO content about 30%.
 Proportion of Component A: Component B in the mixture=about 14:1 (parts by weight) non-foaming.

BRIEF DESCRIPTION OF THE DRAWINGS

Embodiments of the invention are shown diagramatically in the drawings, in which.

DETAILED DESCRIPTION OF THE PREFERRED EMBODIMENTS OF THE INVENTION

Figure 1:
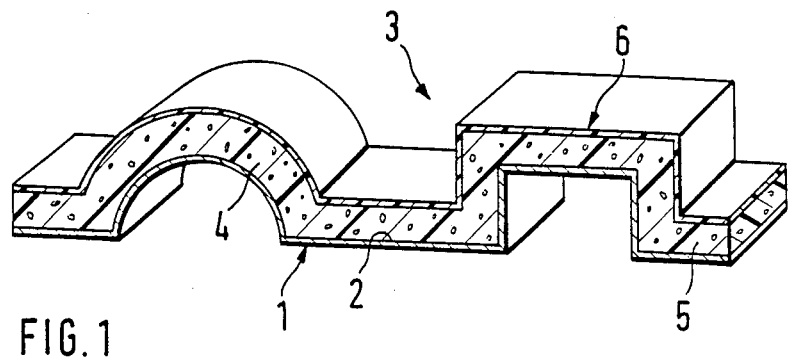
FIGS. 1 and 2 show different forms of a sound-insulating adhesive system applied as a wall covering to a wall part made of contoured sheet metal.
Figure 2:
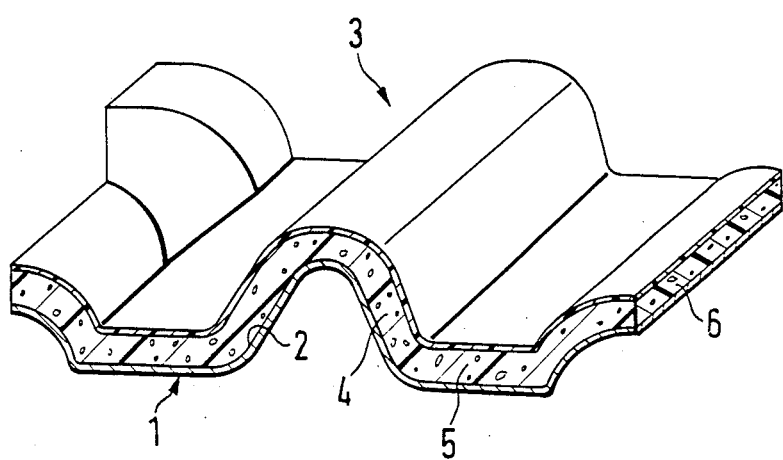

The metal sheet forming the wall part 1 exhibits contours that are followed by the wall-covering 3 which is formed as a moulding, such that approximately the same thickness of the wall-covering 3 is always maintained. The wall-covering 3 is applied adherently to the metal sheet without having to use a glue by means of an adhesive coating 2 or an appropriately positioned spring.

The wall covering 3 consists, as is known per se, of a so-called spring 4, 5 of foam, fibre or the like and a mass 6 of a filled synthetic material.

According to the invention, locally varied sound-insulation ability is achieved by adhesive coatings 2 applied over part of the surface, or if desired uniform sound-insulating ability is achieved over the whole surface by adhesive coating of the spring 4, 5 over its whole surface.

It is found that the adhesion of the coating material of the spring 4, 5 or of the spring itself can be varied practically continuously in the production of the wall covering 3, namely by corresponding control of the properties of the mixture by the cross-linking agent. Thus in the case of substantially constant thickness and locally varied sound-insulation ability all that is needed is a single simple process, in which stiffening coatings can also be applied if desired.

What is claimed is:

1. A shaped, sound insulating material, comprising:
   a layer of resilient material generally defining the size and shape of the insulating material, and defining a surface adapted to be fitted against a wall or substrate; and
   an adhesive layer on the surface of the resilient layer, and including a highly under-cross-linked polyol uniformly distributed over, and permanently held outside of, at least a part of the surface of the resilient layer to releasably adhere the insulating material to the wall or substrate and to allow the insulating material to be removed from the wall or substrate without damaging said insulating material.

2. Material according to claim 1, wherein the adhesive layer further includes a filler mixture of bitumen and atactic polypropylene.

3. Material according to claim 2, wherein the bitumen includes oxidation bitumen.

4. Material according to claim 3, wherein the mixture has a ratio of atactic polypropylene to bitumen of about 1:3.

5. Material according to claim 2, wherein the filler mixture has a melt viscosity at 180° C. of greater than 50,000 mPa sec., and a penetration value according to DIN 1995 between 15 and 55.

6. Material according to claim 5, wherein the penetration value is between 35 and 55.

7. Material according to claims 1 or 2, wherein the adhesive layer exhibits acoustically dampening properties.

8. Material according to claims 1 or 2, wherein the highly under-cross-linked polyol is uniformly distributed over the whole of the surface of the resilient layer.

9. Material according to claims 1 or 2, further including a stiff material covering the highly under-cross-linked polyol, and wherein said highly under-cross-linked polyol is sandwiched between the stiff covering and the resilient layer.

10. Material according to claim 9, wherein the stiff covering is selected from the group consisting of kraft paper and sprayable hardenable plastics.

11. Material according to claims 1, 2 or 5, wherein the adhesive layer is sprayed onto the resilient layer.

12. Material according to claim 1, wherein the adhesive layer is foamed onto the resilient layer.

13. Material according to claim 9, wherein the stiff covering defines a plurality of openings allowing the highy-under-cross-linked polyol to engage the wall or substrate through the stiff covering.

14. Material according to claim 1, wherein:
   the resilient layer has an irregular shape and defines a plurality of recesses and protuberances; and
   the highly under-cross-linked polyol is sprayed onto said resilient layer.

15. Material according to claim 1, wherein:
   the resilient layer has an irregular shape and defines a plurality of recesses and protuberances; and
   the highly under-cross-linked polyol is foamed onto said resilient layer.

16. Material according to claim 1, wherein:
   the resilient layer comprises a foam material; and
   the highly under-cross linked polyol is applied onto said foam material.

17. Material according to claim 1, wherein:
   the resilient layer comprises a fiber material; and
   the highly under-cross linked polyol is applied onto said fiber material.

* * * * *